United States Patent [19]

Campbell

[11] Patent Number: 4,846,710
[45] Date of Patent: Jul. 11, 1989

[54] APPARATUS FOR AIDING IN LEARNING CORRECT PENMANSHIP

[76] Inventor: Cynthia J. Campbell, P.O. Box 865, Newington, Conn. 06111

[21] Appl. No.: 104,300

[22] Filed: Oct. 5, 1987

[51] Int. Cl.⁴ .............................................. G09B 11/02
[52] U.S. Cl. ........................................ 434/166; 401/8
[58] Field of Search .................. 401/6, 7, 8; 434/166; 15/443

[56] References Cited

U.S. PATENT DOCUMENTS

| | | | |
|---|---|---|---|
| 343,391 | 6/1886 | Peiter | 401/8 |
| 629,436 | 7/1899 | Faust | 15/443 |
| 836,652 | 11/1906 | Rosdahl | 401/6 X |
| 974,887 | 11/1910 | Huddle | 401/8 |
| 1,094,888 | 4/1914 | Ehrle | 401/8 |
| 1,125,405 | 1/1915 | Seabaugh | 401/8 |
| 1,861,241 | 5/1932 | Putnam | 15/443 |
| 1,879,456 | 9/1932 | Parsons | 401/7 |
| 3,947,977 | 4/1976 | Bishop | 434/166 |

Primary Examiner—William H. Grieb
Attorney, Agent, or Firm—Robert S. Smith

[57] ABSTRACT

Apparatus for attachment to a pen or pencil to aid a student of penmanship and to assist that student in leaning the proper position of the student's fingers on an associated pen or pencil which includes a sleeve dimensioned and configured for engaging the forefinger and apparatus for securing the sleeve to the associated pen or pencil.

2 Claims, 1 Drawing Sheet

APPARATUS FOR AIDING IN LEARNING CORRECT PENMANSHIP

BACKGROUND OF THE INVENTION

This invention relates to writing instruments such as pens and pencils, and more specifically to attachments to such writing instruments to assist in grasping the instrument properly and to promote ease of writing and good penmanship.

It is very common for children when first learning to write to grasp a pen or pencil with a fist or with some other incorrect penmanship technique. It is often difficult to teach the child to grasp the pen in the conventional and preferred manner.

The prior art includes the following U.S. Pat. Nos:
629,436 Faust
836,652 Rosdahl
1,879,456 Parsons
1,861,241 Putnam
3,947,977 Bishop Rosdahl and Putnam's inventions are not attachments, as such; they depend on the peculiar shape of the body of the writing instrument itself to provide a guide for proper grasping of the instrument. They are designs applicable to a typical pen holder that is constructed to accept individual, replaceable pen points.

Faust's attachment, shaped from a single piece of metal, slips onto the body of the pen or pencil; its shape is such that it contacts the portion of the writer's hand between the ball of the thumb and the base of the forefinger.

Parson's device slips onto the body of the pen or pencil and incorporates indentations that aid in positioning the thumb, forefinger, and middle finger. Bishop's attachment likewise slips over the body of the writing instrument. The device consists of a three-dimensional body molded in one piece; the sidewalls and a portion of the bottom base engage the palm of the writer's hand. A thin tail section of the device rests on the web portion of the hand between the thumb and forefinger.

None of the above devices provide, in themselves, for use by a lefthanded writer. A lefthanded user can only by accommodated by the use of a separate attachment that has been constructed in the opposite hand, or mirror image.

It is an object of this invention to provide a simple, inexpensive device that will assist the writer in the proper grasp of the writing instrument and promote smooth and proper penmanship.

It is another object of the invention to provide apparatus that can be attached to a previously manufactured pen or pencil.

It is still another object of the invention to provide apparatus that is easy to attach to a previously manufactured pen or pencil.

It is a further object of the this invention to provide a device that, in one form, will be usable by either a righthanded or lefthanded writer.

Other objects and advantages will become apparent in the following detailed description, taken in conjunction with the accompanying drawings.

SUMMARY OF THE INVENTION

It has now been found that these and other objects of the invention may be attained in apparatus which includes an attachment for a pen or pencil to aid a student of penmanship and to assist that student in learning the proper position of the student's fingers on an associated pen or pencil. The apparatus includes a sleeve dimensioned and configured for engaging the forefinger and means for securing the sleeve to the associated pen or pencil.

The sleeve may include a geometric axis and the associated pen or pencil has a geometric axis; the means for securing orients the respective axes in oblique relationship. The means for securing may include means permitting variation in the angular relationship between the respective axes such as a pivotal connection. The means for securing the sleeve to the associated pen or pencil may include a sleeve shaped member having a tab extending in a generally axial direction. The sleeve may be dimensioned and configured for engaging the forefinger carried on the tab.

DESCRIPTION OF THE PREFERRED EMBODIMENT

Figure 1:
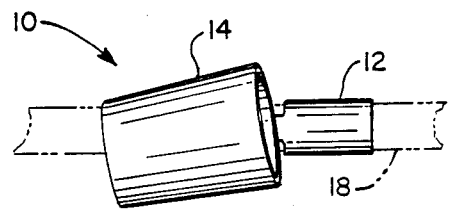
FIG. 1 is a top view of a writing instrument attachment made in accordance with the invention.
Figure 4:
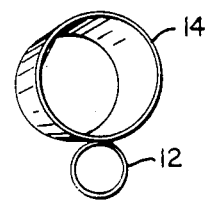
FIG. 4 is an end view of the attachment shown in FIG. 1.
Figure 2:
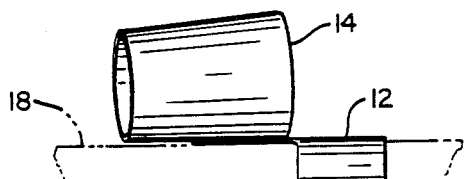
FIG. 2 is a front view of the attachment shown in FIG. 1.

Referring now to FIGS. 1-5, a writing instrument attachment 10 is shown, consisting of a sleeve 12 and a finger guide 14. Sleeve 12 is a cylindrical tube designed to slip over the body of the writing instrument 18 with a light push fit.

A narrow portion of one side of the sleeve 12 is extended to form a tab 16. The tab 16 is secured to a finger guide 14 by means of welding, brazing, or suitable adhesive. The finger guide 14 is a conical shell, of a size to permit easy insertion of the tip of the forefinger; it is secured to the tab 16 in a slightly angled position.

Figure 5:
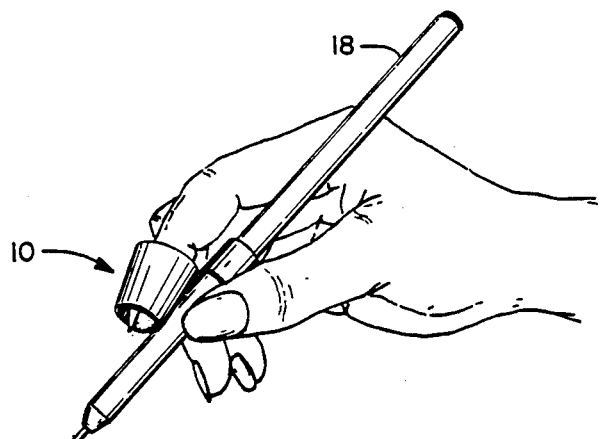
FIG. 5 is a perspective view showing the attachment in use.

FIG. 5 illustrates the attachment is use. The angled attitude of the finger guide 14 permits a natural grasp of the pen or pencil with the forefinger inserted into the finger guide 14, helping the user maintain the proper grip on the writing instrument 18.

Figure 6:
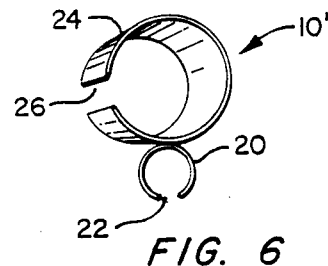
FIG. 6 is an end view of a second embodiment of the invention.
Figure 3:
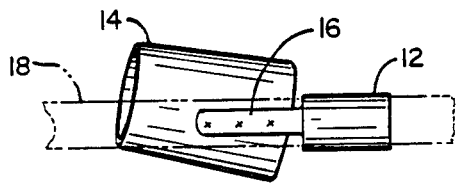
FIG. 3 is a bottom view of the attachment shown in FIG. 1.

FIG. 6 illustrates another embodiment; the attachment 10' incorporates a sleeve 20 and a finger guide 24 similar to the first embodiment. However, in this embodiment, the sleeve 20 and/or the finger guide 24 contain longitudinal slots 22 and 26 respectively. This permits the sleeve 20 to accommodate variations in the size of the body of the writing instrument 18, and further permits the finger guide 24 to accommodate variations in the size of the forefinger.

Figure 7:
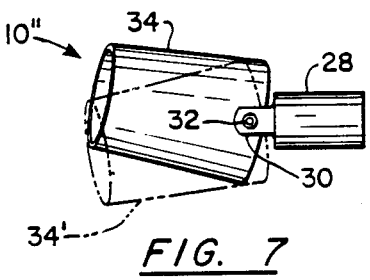
FIG. 7 is a bottom view of yet another embodiment of the invention.

FIG. 7 illustrates yet another embodiment. Attachment 10" consists of sleeve 28, similar in size to sleeve 12, but with a tab 30 that may be much shorter than tab 16. The finger guide 34, similar in size to guide 14, is fastened to tab 30 by means of a single rivet 32. The riveted connection is tight but movable. This feature permits finger guide 34 to be moved to position 34'; in this position it may be used by a lefthanded writer.

While specific embodiments of the invention have been disclosed above, it should be understood that various modifications within the spirit of the invention may occur to those skilled in the art. Therefore it is intended that no limitations be placed on the invention except as defined by the scope of the appended claims.

Having thus described my invention I claim:

1. An attachment for a pen or pencil to aid a student of penmanship and to assist that student in learning the proper position of the students fingers on an associated pen or pencil which comprises:
   a first sleeve dimensioned and configured for engaging the forefinger intermediate the tip and the joint thereof nearest the tip of the forefinger; and
   means for securing said first sleeve to the associated pen or pencil, said first sleeve has a geometric axis and the associated pen or pencil has a geometric axis, said means for securing orienting the respective axes in oblique relationship, said means for securing said first sleeve to the associated pen or pencil includes a second sleeve having a tab extending in a generally axial direction, said said second sleeve being fixed to said tab.

2. An attachment for a pen or pencil to aid a student of penmanship and to assist that student in learning the proper position of the students fingers on an associated pen or pencil which comprises:
   a first sleeve dimensioned and configured for engaging the forefinger intermediate the tip and the joint thereof nearest the tip of the forefinger; and
   means for securing said first sleeve to the associated pen or pencil, said first sleeve has a geometric axis and the associated pen or pencil has a geometric axis, said means for securing orienting the respective axes in oblique relationship, said means for securing said first sleeve to the associated pen or pencil includes a second sleeve having a tab extending in a generally axial direction, said said second sleeve being pivotally mounted to said tab.

* * * * *